US006803686B2

(12) United States Patent
Bauer et al.

(10) Patent No.: US 6,803,686 B2

(45) Date of Patent: Oct. 12, 2004

(54) ELECTROMECHANICAL ACTUATOR

(75) Inventors: Erwin Bauer, Regensburg (DE); Wolfram Bohne, Kirchseeon (DE); Wolfgang Hundt, München (DE); Hanspeter Zink, Regensburg (DE)

(73) Assignees: Siemens Aktiengesellschaft, Munich (DE); Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/992,996

(22) Filed: Nov. 14, 2001

(65) Prior Publication Data

US 2002/0060503 A1 May 23, 2002

Related U.S. Application Data

(63) Continuation of application No. PCT/DE00/01033, filed on Apr. 4, 2000.

(30) Foreign Application Priority Data

May 14, 1999 (DE) ........................................ 199 22 425

(51) Int. Cl.[7] .......................... H02K 5/22; H02K 15/14

(52) U.S. Cl. ............................ 310/71; 310/31; 310/15; 310/17; 29/596; 29/602.1

(58) Field of Search ................................ 29/602.1, 596; 310/31, 17, 15, 71

(56) References Cited

U.S. PATENT DOCUMENTS

| | | | | | |
|---|---|---|---|---|---|
| 2,481,680 A | * | 9/1949 | Mills | ........................... | 310/17 |
| 3,130,333 A | * | 4/1964 | Freye | ........................... | 310/32 |
| 3,184,622 A | * | 5/1965 | Levine | ........................... | 310/31 |
| 3,670,188 A | * | 6/1972 | Voros, Jr. | ..................... | 310/17 |
| 5,887,553 A | * | 3/1999 | Ballmann et al. | ........ | 123/90.11 |

FOREIGN PATENT DOCUMENTS

| | | |
|---|---|---|
| DE | 24 00 509 | 7/1975 |
| DE | 196 47 305 C 1 | 2/1998 |
| DE | 197 56 095 A 1 | 6/1999 |
| EP | 0 798 449 A1 | 10/1997 |
| JP | 60-249302 | 12/1985 |
| JP | 04131734 | 5/1992 |

* cited by examiner

*Primary Examiner*—Tran Nguyen
*Assistant Examiner*—J. Aguirrechea
(74) *Attorney, Agent, or Firm*—Laurence A. Greenberg; Werner H. Stemer; Ralph E. Locher

(57) ABSTRACT

An electromechanical actuator has at least one electromagnet, an armature and a resetting device. A connector is provided, with at least one contact element, which is electro-conductively connected to the coil of the electromagnet, and which is disposed in such a way that, at least during the assembly to the actuator onto a support, it can be electrically contacted by an assembly contacting element.

2 Claims, 2 Drawing Sheets

ELECTROMECHANICAL ACTUATOR

CROSS-REFERENCE TO RELATED APPLICATION

This application is a continuation of copending International Application No. PCT/DE00/01033, filed Apr. 4, 2000, which designated the United States.

BACKGROUND OF THE INVENTION

Field of the Invention

The invention relates to an electromechanical actuator, in particular for a gas exchange valve of an internal combustion engine. The actuator contains at least one electromagnet having a coil and an armature having a shank and is mechanically coupled to at least one resetting device and is movable between a first contact surface on the electromagnet and a second contact surface.

A known electromechanical actuator (see German Patent DE 196 47 305 C1) has two electromagnets, which each have a coil, and an armature, which has a shank and is mechanically coupled to a spring. The armature is movable between a first contact surface on the first electromagnet and a second contact surface on the second electromagnet. The actuator is disposed in a cylinder head of an internal combustion engine. When no current is flowing through the coils of the electromagnets, the shank of the armature is positively coupled to a shank of a gas exchange valve. The shank of the gas exchange valve is coupled to a second spring, which acts counter to the first spring, whereby the frictional connection is established between the shank of the gas exchange valve and the shank of the armature. When the actuator is being assembled in the cylinder head, the shank of the armature plate must be positioned exactly in line with the shank of the gas exchange valve. Furthermore, the first and second springs must be compressed during assembly, in order to bring the actuator into the assembly position. If the force necessary for this is not exerted exactly, screw bolts that are usually used for fixing the actuator in the cylinder head, and an associated thread, are subjected to high tensile stresses and may be damaged as a result.

SUMMARY OF THE INVENTION

It is accordingly an object of the invention to provide an electromechanical actuator that overcomes the above-mentioned disadvantages of the prior art devices and methods of this general type, such that it can be assembled easily and reliably on a support. A further object of the invention is to specify a method that ensures reliable and easy assembly of the actuator on the support.

With the foregoing and other objects in view there is provided, in accordance with the invention, an electromagnetic actuator. The actuator contains at least one electromagnet having a coil and a first contact surface; a second contact surface; at least one resetting device; and an armature having a shank mechanically coupled to the resetting device. The armature is movable between the first contact surface on the electromagnet and the second contact surface. A connector having at least one contact element is electroconductively connected to the coil of the electromagnet and disposed such that, at least during an assembly of the actuator onto a support, the contact element can be electrically contacted by an assembly contacting element.

In accordance with an added feature of the invention, the connector has an opening formed therein, and the contact element has a region configured as a service contact that is led through the opening in the connector. The service contact, at least during the assembly of the actuator onto the support, can be electrically contacted by the assembly contacting element.

In accordance with another feature of the invention, the connector has a housing with the opening formed therein. The service contact is led in an oil-proof manner through the opening in the housing of the connector.

With the foregoing and other objects in view there is further provided, in accordance with the invention, a method of mounting an actuator. The method includes providing an electromagnetic actuator containing at least one electromagnet having a coil and a first contact surface, a second contact surface, at least one resetting device, an armature having a shank mechanically coupled to the resetting device and the armature being movable between the first contact surface on the electromagnet and the second contact surface, and a connector having at least one contact element electroconductively connected to the coil of the electromagnet and disposed such that, at least during an assembly of the actuator onto a support, the contact element can be electrically contacted by an assembly contacting element. The contact element is then brought into electrical contact with the assembly contacting element. Current is passed through the coil of the electromagnet in such a way that an armature plate of the armature comes into contact with the first contact surface. The actuator is then fixed on the support. Then the electrical contact between the contact element and the assembly contacting element is broken.

Other features which are considered as characteristic for the invention are set forth in the appended claims.

Although the invention is illustrated and described herein as embodied in an electromechanical actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
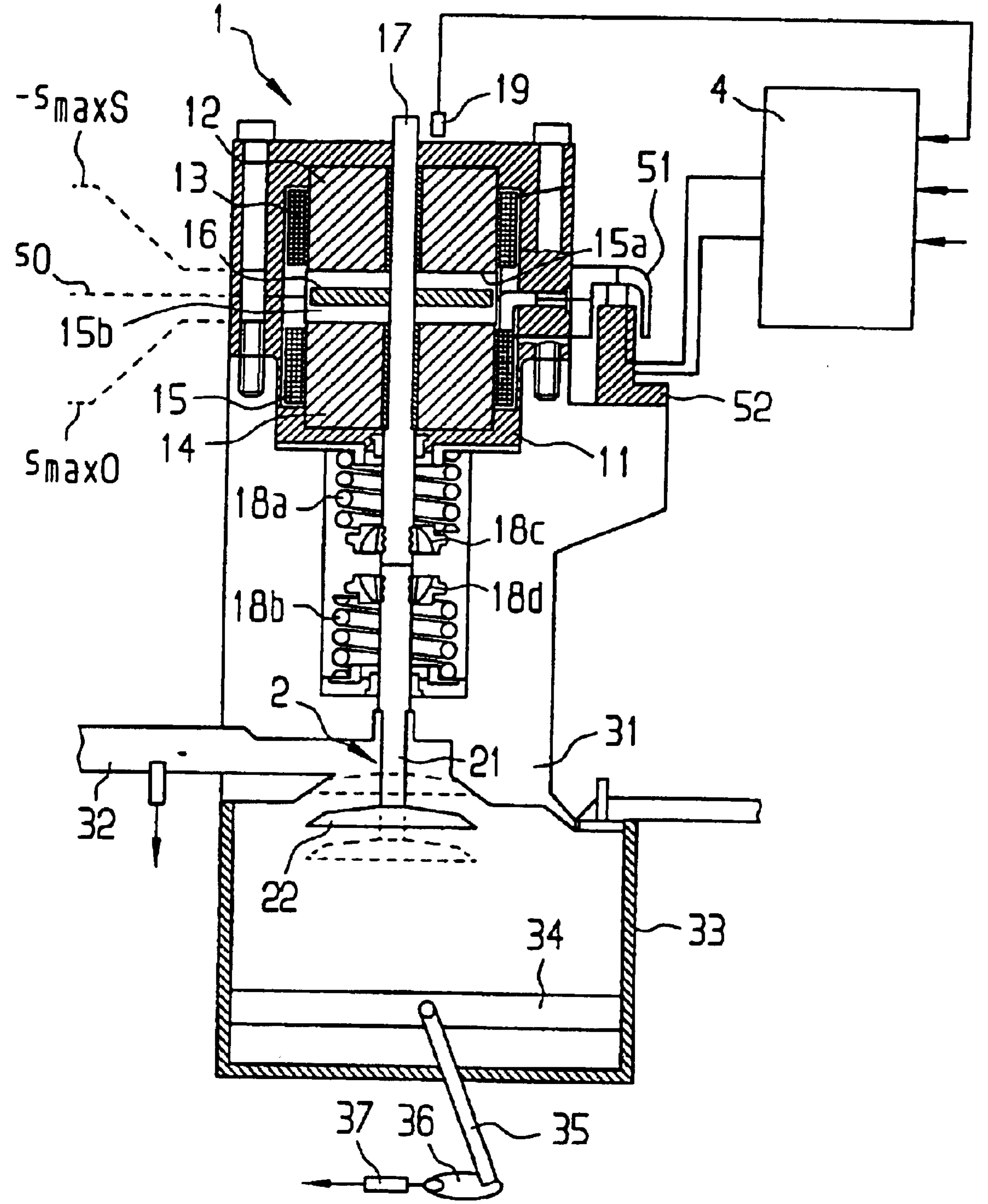
FIG. 1 is a diagrammatic sectional view of a configuration of an actuator in an internal combustion engine according to the invention.

In all the figures of the drawing, sub-features and integral parts that correspond to one another bear the same reference symbol in each case. Referring now to the figures of the drawing in detail and first, particularly, to FIG. 1 thereof, there is shown an internal combustion engine that contains an actuator 1, which acts on a gas exchange valve 2 and is disposed in a cylinder head 31 of the internal combustion engine. The gas exchange valve 2 is configured either as an outlet valve or as an inlet valve. The gas exchange valve 2 has a valve shank 21 and a disk 22. The actuator 1 has a housing 11, in which a first and a second electromagnet are disposed. The first electromagnet has a first core 12, which is provided with a first coil 13. The second electromagnet has a second core 14, which is provided with a second coil 15. An armature is provided, and has an armature plate 16 disposed in the housing 11 movably between a first contact surface 15*a* of the first electromagnet and a second contact surface 15*b* of the second electromagnet. The armature plate 16 is consequently movable between a closed position $s_{maxS}$ and an open position $s_{maxO}$. The armature also has a shank 17, which is led through clearances in the first and second cores 12, 14 and can be mechanically coupled to the valve shank 21 of the gas exchange valve 2. A first resetting device 18*a* and a second resetting device 18*b*, which are preferably springs, bias the armature plate 16 into a predetermined rest position $s_0$. The resetting devices 18*a*, 18*b* are disposed on one side of the housing 11 of the actuator 1, toward the gas exchange valve 2, in a clearance in the cylinder head 31. The resetting devices 18*a*, 18*b* are referred to hereafter as springs. The first spring 18*a* is supported on one side on a spring disk, which for its part bears against the housing 11, and on the other side on a further spring disk, which is positively connected to the armature shank 17. The second spring 18*b* is supported on one side on a spring disk, which is supported on the cylinder head 31, and on the other side on a further spring disk, which is positively connected to the valve shank 21 of the gas exchange valve. The armature shank 17 and the valve shank 21 are in line, that is to say positioned coaxially in relation to each other. The springs are preferably configured in such a way that the second spring 18*b* is virtually relieved when the armature plate 16 is in contact with the first contact surface 15*a*, and the first spring 18*a* is largely relieved when the armature plate is in contact with the second contact surface 15*b*. A distance between the first and second contact surfaces, that is between the closed position $s_{maxS}$ and the open position $s_{maxO}$, is for example eight millimeters.

Figure 2:
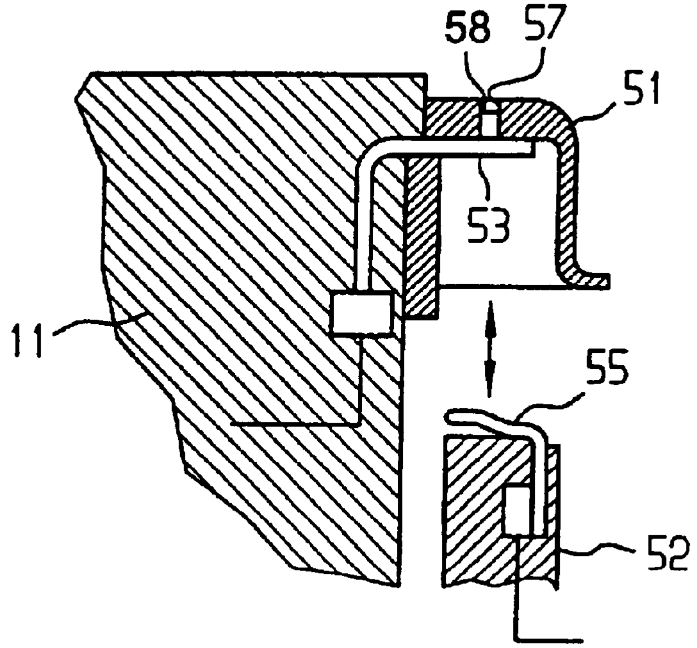
FIG. 2 is an enlarged, partial sectional view of the actuator shown in FIG. 1.
Figure 3:
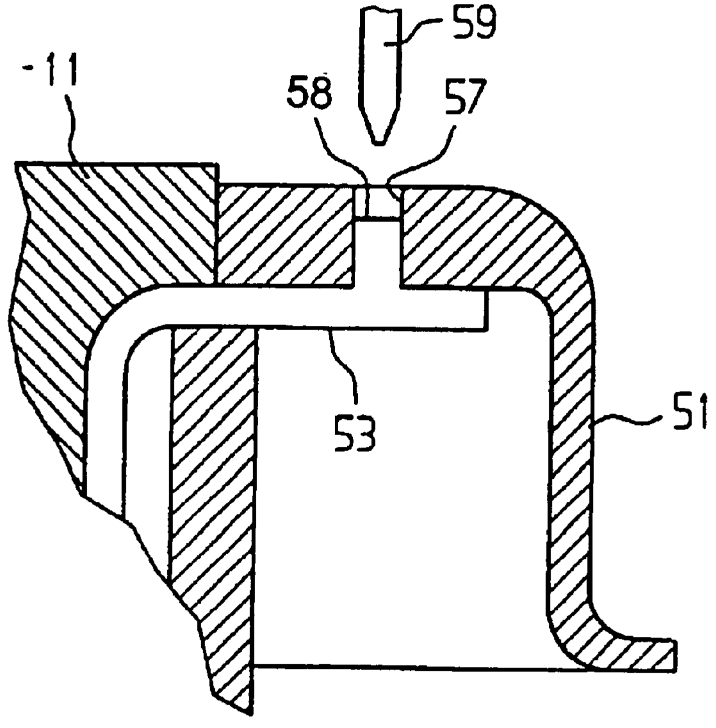
FIG. 3 is an enlarged, partial sectional view of the actuator shown in FIG. 1.

Also assigned to the actuator 2 is a connector 51, disposed in which are contact elements 53 (FIG. 2), which are electro-conductively connected to the coils 13, 15. Furthermore, a connector receptacle 52 is disposed on the cylinder head 31. The connector 51 and the connector receptacle 52 are described in more detail further below with reference to FIGS. 2 and 3. The actuator 1 is rigidly connected to the cylinder head 31 of the internal combustion engine. For this purpose, it is preferably fixed by bolts in a thread of the cylinder head 31. An intake port 32 and a cylinder 33 with a piston 34 are provided in the internal combustion engine. The piston 34 is connected to a crankshaft 36 via a connecting rod 35.

A control device 4 is provided, which receives signals from sensors, which are for example a position sensor 19 and/or a speed sensor 37 and/or a load-sensing sensor. The control device 4 activates the first and second coils 13, 15 of the actuator 1 in accordance with the signals of the sensors 19, 37.

The connector 51 (FIG. 2) has toward the cylinder head 31 an opening, in which the connector receptacle 52 is received. The contact elements 53 are configured either as a contact pin or as a lead frame. Disposed in or on the connector receptacle 52 are resiliently configured contact elements 55, which may similarly be configured for example as contact pins and which are disposed in such a way that they contact the respective contact elements 53 of the connector 51 in the assembled state of the actuator 1 of the internal combustion engine.

To ensure good heat dissipation from the actuator 1, it is preferably surrounded by a coolant. The coolant is preferably in the form of engine oil. The connector 51 and the connector receptacle 52 are therefore configured in such a way that, when the connector receptacle 52 is inserted into the connector 51, the region in which the contact elements 53 contact the resiliently formed contact elements 55 are sealed off with respect to the coolant. Corresponding seals are possibly provided for this purpose on the connector 51 or the connector receptacle 52. This ensures that no short-circuits with neighboring contact elements can occur between the contact elements.

Provided in the connector 51 is a clearance 57, through which a subregion of the contact element 53 configured as a service contact 58 is led. The clearance 57 and the service contact 58 are configured in this case in such a way that, at least during the assembly of the actuator onto the cylinder head 31, the service contact 58 can be electrically contacted by an assembly contacting element 59. The actuator 1 is assembled onto the cylinder head 31 from above (see FIG. 1). Therefore, the service contact 58 is disposed in such a way that it is accessible from the side of the connector 51 remote from the cylinder head.

For the assembly of the actuator 1 onto the cylinder head 31, the assembly contact element 59 is brought into electrical contact with the contact element 53. The assembly contact element 59 is connected to an external power supply. Once contacting has taken place, current is then passed through the first coil 13. To close the circuit of the coil, preferably a second contact element is connected to a service contact and is likewise brought into electrical contact with an assembly contact element if the actuator is not already connected at the factory to a frame terminal. The current through the first coil is predetermined in such a way that the magnetic force generated in the first electromagnet is sufficient to bring the armature plate 16 into contact with the first contact surface 15*a* and hold it there.

Subsequently, the actuator 1 is then positioned in the cylinder head 31 in such a way that the shank 17 and the valve shank 21 are in line and are fixed by bolts, which are screwed into a thread formed in the cylinder head 31. In this case, the contacting element 59 remains in constant contact with the service contact 58, so that the armature plate 16 is held in contact with the first contact surface 15*a* by the force that is generated by the first electromagnet. This ensures by simple measures that the actuator 1 can be positioned exactly and the bolts can be screwed into the thread in the cylinder head 31 without the bolts being subjected to high tensile forces. The service contact 58 is preferably led in an oil-proof manner through the clearance 57 in the connector 51. It is consequently ensured that oil is prevented from being able to pass through the clearance during operation of the internal combustion engine, which could possibly lead to short-circuits between neighboring contact elements.

The actuator 1 is distinguished by the fact that it can be assembled easily and precisely in the cylinder head 31. The electromagnet, present in any case in the actuator 1, is in this case used to exert the necessary force to bring the armature plate 16 into contact with the first contact surface 15*a* and consequently to draw back the free end of the shank 17 on the side on which the spring 18*a* is disposed to the extent that the actuator 1 can be brought into its assembly position on the cylinder head 31 without it being necessary to compress the spring 18*b*.

The springs 18*a*, 18*b* are preferably of a conical configuration. They preferably taper toward the spring disks 18*c*, 18*d*, which are positively connected to the armature shank 17 and to the shank 21 of the gas exchange valve, respectively. The conical configuration of the springs 18*a*, 18*b* has the adventage that they have a smaller mass in comparison with cylindrical springs, i.e. springs with a uniform diameter of the turns. Furthermore, use of the conical springs also allows the spring disks 18*c*, 18*d* to be made smaller. These measures have the effect of reducing the overall moved masses of the actuator, so that the actuator can be operated with greater efficiency. The conical cofiguration of the spring represents an independent invention, irrespective of the presence of the assembly contacting element.

We claim:

1. An electromagnetic actuator, comprising:

at least one electromagnet having a coil and a first contact sur face;

a second contact surface;

at least one resetting device;

an armature having a shank mechanically coupled to said resetting device, said armature being movable between said first contact surface on said electromagnet and said second contact surface; and a connector having at least one contact element electroconductively connected to said coil of said electromagnet, said contact element being electrically contacted by an assembly contacting element upon said connector engaging a connector receptacle, said connector including a housing having an opening formed therein, said contact element having a region configured as a service contact, said service contact being disposed in an oil-proof manner in said opening, and said service contact, at least during the assembly of the actuator onto a support, being electrically contacted by the assembly contacting element.

2. A method of mounting an actuator, which comprises the steps of:

providing an electromagnetic actuator containing at least one electromagnet having a coil and a first contact surface, a second contact surface, at least one resetting device, an armature having a shank mechanically coupled to the resetting device and the armature being movable between the first contact surface on the electromagnet and the second contact surface, and a connector including a housing having an opening formed therein and at least one contact element electroconductively connected to the coil of the electromagnet, the contact element having a region configured as a service contact which is led in an oil-proof manner through the opening, and the service contact element disposed such that, at least during an assembly of the actuator onto a support, the service contact element can be electrically contacted by an assembly contacting element;

bringing the contact element into electrical contact with the assembly contacting element;

passing current through the coil of the electromagnet in such a way that an armature plate of the armature comes into contact with the first contact surface;

fixing the actuator on the support; and breaking the electrical contact between the contact element and the assembly contacting element.

* * * * *